UNITED STATES PATENT OFFICE.

FLOYD J. METZGER, OF NEW YORK, N. Y.

PRODUCTION AND EXTRACTION OF CYANIDS.

1,313,313. Specification of Letters Patent. Patented Aug. 19, 1919.

No Drawing. Application filed September 6, 1918. Serial No. 252,833.

*To all whom it may concern:*

Be it known that I, FLOYD J. METZGER, residing at New York city, in the county of New York, State of New York, have invented certain new and useful Improvements in the Production and Extraction of Cyanids; and I do hereby declare the following to be a full, clear, and exact description of the invention, such as will enable others skilled in the art to which it appertains to make and use the same.

In the production of cyanids, by subjecting to the action of nitrogen, or nitrogen-containing gases, a furnace charge containing carbonaceous material and an alkali such as sodium carbonate or hydroxid, it has been proposed to employ iron for promoting the cyanid production. According to certain proposals, the iron is employed in relatively large amount. The employment of iron in such large amount, for example, in amount equal to as much as 40% of the furnace charge, is objectionable, for the reason that it is difficult to leach the cyanid from the furnace product with water without the formation of appreciable amounts of ferrocyanid which is soluble in water and which contaminates the cyanid extracted. To the extent that the cyanid is converted into ferrocyanid, it is lost so far as the employment of the cyanid for the production of ammonia is concerned.

The present invention relates to a method of improving the extraction of cyanid from furnace products containing the same, even though such furnace products also contain iron in considerable amount. The invention is based upon the discovery that cyanids can be leached from furnace products containing them by means of a composite solvent comprising water and an organic solvent soluble therein, and that such extraction can be effected without any considerable formation of ferrocyanid during the extraction, and without any objectionable extraction with the cyanid of such small amounts of ferrocyanid as may be formed.

The composite solvent which I prefer and recommend in the carrying out of the process of the present invention is made by compounding water with an organic solvent, such as methyl alcohol or wood spirit, denatured alcohol, acetone or other organic solvent which is miscible with water, and which, like those mentioned, has the effect of retarding the formation of ferrocyanid and the solution of such small amounts as may be formed. The proportions of water and of the organic solvent can be varied somewhat, depending upon the composition of the furnace product, and may vary, for example, in the case of denatured alcohol, from 20 to 60 parts of alcohol to 80 to 40 parts of water; or, in the case of acetone, about 10 to 20 parts of acetone to 90 to 80 parts of water.

If the furnace product is one which also contains carbonates, such as sodium carbonate, the extraction of the cyanid with a composite solvent of the character referred to will also be effected without any considerable extraction of the carbonate, inasmuch as the carbonate also is relatively insoluble in such a solvent. The separation of cyanid from products containing it in admixture with carbonate is not claimed broadly herein, but forms the subject matter of a separate application, Serial No. 182,642, filed July 25, 1917. When, however, carbonate is present in furnace products containing iron, there is the added advantage that both the formation and extraction of ferrocyanid can be retarded and the extraction of carbonate also retarded.

When no carbonate is present, the advantages incident to the retarding of the formation and extraction of ferrocyanid will be obtained, with the resulting production of a cyanid solution of correspondingly increased purity, while the residue will contain its iron content for the most part or entirely in such a form that it is available for further use in the cyanid process.

Where carbonate is also present in the furnace product, and the cyanid is leached therefrom by a composite solvent of the character referred to, the residue will contain both the iron and the carbonate, or the greater portion of both of these ingredients, in such form that they are available for further use in the production of cyanid. The advantages in this case are, therefore, cumulative, in that there is obtained a cyanid liquor of increased purity and a residue available for return and re-use in the cyanid production, and without any considerable loss therefrom of either the iron content or the alkali carbonate content, except to the extent that the alkali carbonate is converted into cyanid or into caustic alkali and leached from the furnace product during the extraction.

In the practice of the invention, the cyanid production can be promoted by a relatively small amount of iron as a catalyst, since I have found that it is not necessary to employ an amount of iron as large as, for example, 40%, in order to obtain an effective cyanid production, and it is, moreover, advantageous to employ such a small amount of iron in order that the remainder of the furnace charge can be made up of effective cyanid producing constituents such as carbonaceous material and soda.

The process may thus be carried out with a furnace charge containing about 40% of soda ash; 50% of coke, and 10% of iron (in the form of a reducible compound such as iron ore or iron oxid). Such a charge is advantageously ground in a ball mill to insure intimate admixture of the ingredients. The charge can then be subjected to the action of nitrogen, or a suitable nitrogen-containing gas, at a temperature appropriate to the formation of cyanid, for example, at a temperature of around 850 to 1100° C.; and preferably 1,000 to 1100° C.

The process can with advantage be carried out in a rotary furnace, and in the manner described in my prior application, Serial Number 222,812, filed March 16, 1918; for example, in a rotary furnace of about fifteen inches diameter, inclined at an angle of about 10 degrees, and having a length of about ten feet in the furnace zone, and made of a material such as an alloy of nickel, chromium and iron which is resistant to the furnace atmosphere and to the ingredients of the charge.

When such a rotary furnace is filled with the charge, and is rotated at a rate of about one revolution per minute, the particles of the charge will move relatively during the introduction of nitrogen, so that all of the particles are exposed thereto. The production of cyanid will be thereby promoted and a product in granular form obtained. The nitrogen may be obtained from any source, for example, from a liquid air apparatus which provides nitrogen of relatively high purity, for example, of 99.5 to 99.9%, and may be introduced at a rate of about two cu. ft. per minute. The treatment of the furnace charge with the nitrogen is continued for a proper period of time, for example, for about eight or nine hours, or until the cyanid production has progressed to the desired extent, after which the furnace product can be cooled either in a prolongation of the retort outside the furnace zone, or in a separate receptacle.

The product should be cooled to a relatively low temperature, for example, to about room temperature before the leaching thereof.

The furnace product thus obtained will contain more or less sodium carbonate, together with varying amounts of sodium oxid and an amount of iron corresponding to that employed in the furnace charge. With small amounts of iron, the tendency toward the formation of ferrocyanid is but small, whereas with larger amounts of iron there is a more marked tendency toward such formation.

The furnace product containing the iron is, according to the present invention, leached with such a solvent as those above referred to, which retards the formation of ferrocyanid and the extraction of such amounts of ferrocyanid as may be formed. Such a composite solvent, for example, a composite solvent of water and denatured alcohol in proper proportions, can be freely applied to the furnace product in sufficient amount for the extraction of the cyanid and without any considerable formation or extraction of ferrocyanid or extraction of carbonate.

When sodium carbonate is employed in the furnace charge, the furnace product will usually contain both unconverted sodium carbonate and also sodium oxid, in varying amounts. The sodium oxid present will be converted into the hydroxid and will be extracted with the cyanid, inasmuch as the hydroxid is soluble in such a composite solvent. The extracted hydroxid can thereafter be advantageously separated from the cyanid solution and the cyanid solution thereby purified, by subjecting the solution to a carbonating treatment with carbon dioxid or furnace gases. Thus, by treating the cyanid solution, after its separation from the residue, with carbon dioxid or furnace gases, the sodium hydroxid will be converted into sodium carbonate which is relatively insoluble in the composite solution and which will be precipitated therefrom, so that it can be readily removed, by filtration or otherwise. The filtration or similar operation may, however, be avoided by carbonating the solution while it is still admixed with the residue, so that the sodium carbonate is precipitated back into the residue, and so that the subsequent separation of the cyanid solution from the residue also brings about the separation of the cyanid solution from the precipitated carbonate. By proceeding in this manner, not only is the cyanid solution obtained in a state of increased purity, but the precipitated sodium carbonate is left with the residue and is available for return, together with such unconverted sodium carbonate as the residue may contain, to the cyanid furnace where it can be compounded with further amounts of ingredients for the production of cyanid.

From the cyanid solution which is thus obtained, the cyanid can be recovered by evaporation of the solvent, and it can be obtained directly in a state of relatively high purity, while the solvent can be collected for further use.

The residue from which the cyanid is extracted will be wet with the solvent, and will contain a certain amount of the organic solvent, such as alcohol, which can be recovered by evaporation thereof, either by direct heat or by steaming, and the alcohol thus recovered can be used again in the further carrying out of the process.

The residue will contain the iron which will be for the most part unchanged, while it will also contain the carbonate in case the carbonate is present in the furnace product. This residue can then be returned and used in the compounding of further charges for the cyanid furnace, and it is only necessary to add to it such ingredients as will rectify the composition thereof, that is, it will already contain such an amount of iron that little, if any, additional iron will be required to be added thereto, while its content of carbonate will necessitate a correspondingly reduced further addition thereof. Of course, if further amounts of carbonaceous material and corresponding amounts of soda are admixed with the residue, a further corresponding amount of iron may also be employed.

By thus returning the residue with its contained iron and carbonate, these ingredients are rendered available to the extent that they are returned, and the cyanid process is thereby correspondingly benefited and the amount of fresh re-agents correspondingly reduced. As a result, a materially increased production of cyanid is obtainable and in an advantageous manner from the total amount of alkali, such as sodium carbonate, employed, this sodium carbonate being repeatedly returned with the residue to the extent that it is present therein after the extraction until the residue becomes so contaminated with impurities that its return is no longer advantageous, for example, when the ash constituents of the carbonaceous material, such as coke, accumulate to an objectionable extent.

Where relatively large amounts of iron are employed in the process, this iron will be similarly made available for repeated use in the manner above described, and with similar or corresponding advantage. In fact, the larger the amount of iron employed, the greater the advantage in its return, inasmuch as it is already in a finely divided form, and inasmuch as its return makes unnecessary the addition of large amounts of a fresh source of iron for each furnace charge.

I claim:

1. The method of recovering cyanids from furnace products containing the same in admixture with a relatively large amount of iron, which comprises leaching the cyanid therefrom with a solvent which retards the production and extraction of ferrocyanid.

2. The method of recovering cyanids from furnace products containing the same in admixture with a relatively large amount of iron, which comprises leaching the cyanid therefrom with a composite solvent, containing water and an organic solvent soluble therein, which composite solvent retards the formation and extraction of ferrocyanid.

3. The method of recovering cyanids from furnace products containing the same in admixture with a relatively large amount of iron, which comprises extracting such product with a composite solvent made up of water and alcohol and thereby extracting the cyanid without the formation and extraction of any considerable amount of ferrocyanid.

4. The method of improving the production and extraction of cyanids, which comprises subjecting a furnace charge containing carbonaceous material, alkali and iron to the action of nitrogen or a nitrogen-containing gas at a temperature appropriate to the formation of alkali metal cyanid, extracting the cyanid from the resulting product with a solvent which retards the formation and extraction of ferrocyanid, and thereby obtaining the cyanid substantially free from ferrocyanid and leaving the iron in the residue, and returning the residue for further use in the production of cyanid.

5. The method of improving the production and extraction of cyanids, which comprises subjecting a furnace charge containing carbonaceous material, alkali and iron to the action of nitrogen or a nitrogen-containing gas at a temperature appropriate to the formation of alkali metal cyanid, extracting the cyanid from the resulting product with a solvent which retards the formation and extraction of ferrocyanid, and thereby obtaining the cyanid relatively free from ferrocyanid and leaving the iron in the residue, and returning the residue with its contained iron for further use in the production of cyanid.

6. The method of recovering cyanids from furnace products containing the same in admixture with iron and with carbonates, which comprises extracting such furnace products with a solvent retarding the formation and extraction of ferrocyanid and the extraction of the carbonate.

7. The method of improving the production and extraction of cyanids, which comprises subjecting a furnace charge containing sodium carbonate, carbonaceous material and iron to the action of nitrogen or a nitrogen containing gas at a temperature appropriate to the formation of sodium cyanid, extracting the cyanid from the furnace product with a composite solvent, comprising water and an organic solvent soluble therein, which composite solvent retards the formation and extraction of ferrocyanid and the extraction of sodium carbonate, and thereby obtaining the cyanid relatively free from ferrocyanid and from carbonate, and returning the residue containing the iron and carbonate for further use in the production of cyanid.

8. The method of improving the production and extraction of cyanids, which comprises subjecting a furnace charge containing sodium carbonate, carbonaceous material and iron to the action of nitrogen or a nitrogen containing gas at a temperature appropriate to the formation of sodium cyanid, extracting the cyanid from the furnace product with a composite solvent, comprising water and an organic solvent soluble therein, which composite solvent retards the formation and extraction of ferrocyanid and the extraction of sodium carbonate, thereby obtaining the cyanid relatively free from ferrocyanid and from carbonate, and leaving the iron and the carbonate in the residue, and returning the residue for further use in the production of cyanid.

9. The method of recovering cyanids from furnace products containing the same in admixture with alkali oxids which comprises treating such product with a solvent in which the cyanid and caustic alkali are soluble but in which the alkali carbonate is relatively insoluble, and thereby extracting the cyanid and caustic alkali, carbonating the resulting solution while still admixed with the residue, and thereby precipitating the caustic alkali as carbonate, and separating the remaining cyanid solution from the residue and precipitated carbonate.

10. The method of recovering sodium cyanid from furnace products containing the same in admixture with sodium oxid which comprises treating such furnace product with a solvent, containing water and an organic solvent soluble therein, in which sodium cyanid and caustic soda are soluble but in which sodium carbonate is relatively insoluble, and thereby converting the sodium oxid into hydroxid and extracting hydroxid and cyanid, carbonating the resulting solution while still admixed with the residue and thereby precipitating the sodium hydroxid as carbonate, and separating the remaining cyanid solution from the residue and the precipitated carbonate.

11. The method of recovering sodium cyanid from furnace products containing the same in admixture with sodium carbonate and sodium oxid which comprises treating such furnace product with a solvent, containing water and an organic solvent soluble therein, in which sodium cyanid and caustic soda are soluble but in which sodium carbonate is relatively insoluble, subjecting the resulting solution while still admixed with the residue to a carbonating treatment, and separating the remaining cyanid solution from the residue.

12. The method of improving the production and extraction of cyanids which comprises subjecting a furnace charge containing sodium carbonate, carbonaceous material and iron to the action of nitrogen or nitrogen-containing gases at a temperature appropriate to the formation of sodium cyanid, extracting the cyanid from the furnace product with a composite solvent comprising water and an organic solvent soluble therein, in which solvent sodium carbonate is relatively insoluble, subjecting the resulting solution while still admixed with the residue to a carbonating treatment to precipitate as carbonate the caustic soda contained therein, separating the remaining cyanid solution from the residue, and returning the residue for further use in the production of cyanid.

In testimony whereof I affix my signature.

FLOYD J. METZGER.